(12) United States Patent
Kobayashi (10) Patent No.: US 8,777,259 B2
(45) Date of Patent: Jul. 15, 2014

(54) GAS GENERATOR

(71) Applicant: Daicel Corporation, Osaka (JP)

(72) Inventor: Tomoharu Kobayashi, Tatsuno (JP)

(73) Assignee: Daicel Corporation, Osaka-shi (JP)

( * ) Notice: Subject to any disclaimer, the term of this patent is extended or adjusted under 35 U.S.C. 154(b) by 0 days.

(21) Appl. No.: 14/068,130

(22) Filed: Oct. 31, 2013

(65) Prior Publication Data

US 2014/0123868 A1     May 8, 2014

Related U.S. Application Data

(60) Provisional application No. 61/724,250, filed on Nov. 8, 2012.

(30) Foreign Application Priority Data

Nov. 8, 2012  (JP) ................ 2012-245984

(51) Int. Cl.
*B60R 21/272*     (2006.01)

(52) U.S. Cl.
USPC .......................... 280/737; 280/741

(58) Field of Classification Search
CPC ............ B60R 21/272; B60R 21/274; B60R 2021/26094
USPC ................... 280/737, 736, 741
See application file for complete search history.

(56) References Cited

U.S. PATENT DOCUMENTS

| | | | |
|---|---|---|---|
| 3,690,695 A * | 9/1972 | Jones et al. | 280/741 |
| 6,010,153 A | 1/2000 | Halas et al. | |
| 6,231,079 B1 | 5/2001 | Perotto et al. | |
| 6,234,522 B1 | 5/2001 | Albrecht et al. | |
| 6,447,008 B1 * | 9/2002 | Karlin et al. | 280/741 |
| 7,007,610 B2 * | 3/2006 | Karlin et al. | 102/531 |
| 7,059,633 B2 * | 6/2006 | Wang et al. | 280/737 |
| 2002/0074787 A1 | 6/2002 | Anacker et al. | |
| 2005/0189753 A1 | 9/2005 | Kato et al. | |
| 2006/0037662 A1 | 2/2006 | Fink | |
| 2009/0096197 A1 | 4/2009 | Poindron et al. | |

FOREIGN PATENT DOCUMENTS

| | | |
|---|---|---|
| JP | 10-230814 A | 9/1998 |
| JP | 2000-354756 A | 12/2000 |
| JP | 2002-504046 A | 2/2002 |
| JP | 2002-513347 A | 5/2002 |
| JP | 2005-225274 A | 8/2005 |
| JP | 2009-519168 A | 6/2007 |
| WO | WO 2007/068605 A2 | 6/2007 |

* cited by examiner

*Primary Examiner* — Ruth Ilan
(74) *Attorney, Agent, or Firm* — Birch, Stewart, Kolasch & Birch, LLP (57) ABSTRACT

A gas generator includes a cylindrical ignition device chamber, a cylindrical pressurized gas chamber, a closing member having a fragile portion, a multifunctional member inside the ignition device chamber, and having a base plate portion with a first through-hole and a cylindrical wall portion with a second through-hole, an opening portion of the cylindrical wall portion abutting against the fragile portion, first and second plenum chambers, a discharge port in the ignition device chamber housing facing the second plenum chamber, and the multifunctional member movable in the axial direction to rupture the closing member. Gas passing through the first through-hole, the first plenum chamber, the second through-hole and the second plenum chamber is discharged from the gas discharge port. Gas inside the pressurized gas chamber housing entering the first plenum chamber, passes through the second through-hole and the second plenum chamber and is discharged from the gas discharge port.

10 Claims, 3 Drawing Sheets

GAS GENERATOR

This nonprovisional application claims priority under 35 U.S.C. §119(a) to Patent Application No. 2012-245984 filed in Japan on 8 Nov. 2012 and 35 U.S.C. §119(e) to U.S. Provisional application No. 61/724,250 filed on 8 Nov. 2012, which are incorporated by reference.

BACKGROUND OF INVENTION

1. Field of Invention

The present invention relates to a gas generator used in a restraining device of an air bag system for a vehicle and the like.

Generally, in a gas generator using a pressurized gas (a pressurized medium), an opening portion of a bottle in which the pressurized gas is sealed in is closed by closing means and the pressurized gas is discharged by rupturing the closing means during activation.

Furthermore, such a gas generator is desired that the time measured from activation (for example, when an igniting current flows in an electric igniter) until start of gas discharge is minimized and prompt gas discharge is obtained (a restraining device or the like is promptly activated).

2. Description of Related Art

US-A No. 2006/0037662 discloses a gas generator which uses a pressurized gas, wherein at an igniter 20 attached to one end of a housing 16, a projectile 22 is attached to a cylindrical body 82 charged with an ignition charge. A chamber 38 filled with a pressurized gas and the igniter 20 are separated from each other by a closure member 14, and the projectile 22 abuts the closure member 14.

SUMMARY OF INVENTION

The invention 1 of the present invention provides a gas generator including:

a cylindrical ignition device chamber housing provided with a gas discharge port, accommodating an igniter and a gas generating agent therein, the igniter closing an opening portion of the ignition device chamber housing and being fixed thereto;

a cylindrical pressurized gas chamber housing filled with pressurized gas, the cylindrical pressurized gas chamber housing being joined to the ignition device chamber housing to form an outer shell container;

a closing member being provided with a fragile portion and closing between the ignition device chamber housing and the pressurized gas chamber housing;

a multifunctional member that is movable in an axial direction during activation being arranged inside the ignition device chamber housing together with the igniter and the gas generating agent the multifunctional member having, a base plate portion abutting against an inner wall surface of the ignition device chamber housing and having a first through-hole in a thickness direction, and a cylindrical wall portion extending from one surface of the base plate portion, the cylindrical wall portion having an opening portion at a distal end thereof and a smaller outer diameter than an outer diameter of the base plate portion, and being provided with a second through-hole in the thickness direction thereof, the opening portion of the cylindrical wall portion abutting against the fragile portion of the closing member;

a first plenum chamber enclosed by the base plate portion, the cylindrical wall portion and the closing member;

a second plenum chamber formed by a cylindrical space between an outer wall surface of the cylindrical wall portion and the inner wall surface of the ignition device chamber housing, and being disposed such that the gas discharge port is provided in a circumferential wall portion of the ignition device chamber housing and facing the second plenum chamber;

a gas generating agent charging chamber enclosed by the base plate portion, the igniter, and the inner wall surface of the ignition device chamber housing and charged with the gas generating agent, by pressure increase inside the ignition device chamber housing due to combustion gas generated by combustion of the gas generating agent, the multifunctional member being moved in the axial direction to rupture the closing member, the combustion gas passing through the first through-hole, the first plenum chamber, the second through-hole and the second plenum chamber, and being discharged from the gas discharge port, the pressurized gas inside the pressurized gas chamber housing entering the first plenum chamber from an opening portion obtained by rupture of the closing member, passing through the second through-hole and the second plenum chamber, and being discharged from the gas discharge port.

The invention 2 of the present invention provides a gas generator, including:

a cylindrical ignition device chamber housing provided with a gas discharge port, accommodating an igniter and a gas generating agent therein, the igniter closing an opening portion of the ignition device chamber housing and being fixed thereto;

a cylindrical pressurized gas chamber housing filled with pressurized gas, the cylindrical pressurized gas chamber housing being joined to the ignition device chamber housing to form an outer shell container;

a closing member being provided with a fragile portion and closing between the ignition device chamber housing and the pressurized gas chamber housing;

a multifunctional member that is movable in an axial direction during activation being arranged inside the ignition device chamber housing together with the igniter and the gas generating agent, the multifunctional member having, a base plate portion abutting against an inner wall surface of the ignition device chamber housing and having a first through-hole in a thickness direction, and a columnar portion extending from a central portion of one surface of the base plate portion and abutting against the fragile portion of the closing member;

a plenum chamber formed by the base plate portion, the inner wall surface of the ignition device chamber housing and the closing member, and being disposed such that the gas discharge port is provided in a circumferential wall portion of the ignition device chamber housing and facing the plenum chamber;

a gas generating agent charging chamber enclosed by the base plate portion, the igniter, and the inner wall surface of the ignition device chamber housing and charged with the gas generating agent, by pressure increase inside the ignition device chamber housing due to combustion gas generated by combustion of the gas generating agent, the multifunctional member being moved in the axial direction to rupture the closing member, the combustion gas passing through the first through-hole, the plenum chamber, and being discharged from the gas discharge port, the pressurized gas inside the pressurized gas chamber housing entering the plenum chamber from an opening portion obtained by rupture of the closing member, passing and being discharged from the gas discharge port.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In the gas generator of US-A No. 2006/0037662, activation of the igniter 20 causes the projectile 22 to move and rupture the closure member 14, thereby the pressurized gas is discharged to the outside from a discharge port 18. However, since the gas is not discharged unless the closure member 14 is ruptured, the time measured from activation (activation of the igniter 20) until the gas is discharged may become prolonged. In this regard, there is still room for further improvement.

The present invention provides a gas generator capable of maintaining high performance during a life time of a vehicle and discharging gas early in an initial stage of activation when applied to a restraining device of an air bag system of the vehicle or the like.

When the gas generator according to the present invention is used in a restraining device of an air bag system of a vehicle, the gas generator can be used as a hybrid gas generator which inflates an air bag using both pressurized gas filled in the cylindrical pressurized gas chamber housing and combustion gas generated by the combustion of the gas generating agent in the ignition device chamber housing.

Note that when a gas generator, in which a gas generating agent and an igniter are integrated with each other (for example, a gas generator described in JP-A No. 2005-225274 as a gas generator for a seatbelt retractor), is used as an ignition device, the gas generating agent can be omitted.

The multifunctional member used in the gas generator according to the present invention functions to hold and rupture a closing member, to retain the gas generating agent, and to secure a gas discharge path.

The multifunctional member has a base plate portion and a cylindrical wall portion extended from one surface of the base plate portion. In addition, an end of the cylindrical wall portion on an opposite side of the base plate portion is an opening portion.

The presence of the multifunctional member enables to exhibit functions (I) and (II) below, and additionally a function (III).

(I) Holding and Rupturing Function of the Closing Member

Prior to activation (prior to activation of the ignition device; the same applies hereinafter), the opening portion of the cylindrical wall portion of the multifunctional member abuts against the fragile portion of the closing member, thereby the closing member is supported. That is, a circumferential edge of the opening portion of the cylindrical wall portion abutting against the fragile portion of the closing member.

Since the pressurized gas chamber housing is filled under high pressure with a pressurized gas, high pressure is also applied to the closing member from the inside of the pressurized gas chamber housing.

In addition, since the fragile portion is formed in the closing member so as to be ruptured invariably during activation (during activation of the ignition device; the same applies hereinafter), maintaining pressure resistance particularly at the fragile portion is important.

In the present invention, since the fragile portion of the closing member is supported by the multifunctional member, the closing member that is under high pressure is sufficiently supported.

And, since the multifunctional member is fixed and held to the ignition device chamber housing and a load produced by the pressurized gas is distributed by the multifunctional member, a load does not concentrate at one location.

Furthermore, during activation, the multifunctional member (the base plate portion and the cylindrical wall portion) moves in the axial direction (toward the closing member) and the closing member is ruptured at the fragile portion by the opening portion of the cylindrical wall portion. As a result, a discharge path of the pressurized gas is opened.

The base plate portion of the multifunctional member is abutted against the inner wall surface of the ignition device chamber housing at such a degree that the base plate portion of the multifunctional member can readily move during activation.

(II) Function to Secure a Gas Discharge Path

In the multifunctional member, a first through-hole is formed in the base plate portion and a second through-hole is formed in the cylindrical wall portion.

The base plate portion is abutted against the inner wall surface of the ignition device chamber housing. The cylindrical wall portion has a smaller outer diameter than an outer diameter of the base plate portion.

By arranging the multifunctional member described above in the ignition device chamber housing, the first plenum chamber and the second plenum chamber are formed.

During activation, due to the arrangement of the multifunctional member and the presence of the first through-hole, the first plenum chamber, the second through-hole and the second plenum chamber, a discharge path of the combustion gas generated in the ignition device chamber housing and a discharge path of the pressurized gas are secured. Moreover, at least a section between the gas generating agent charging chamber and the second plenum chamber may be placed in a communicated state prior to activation.

A size of the first through-hole is set to an opening portion area which allows the combustion gas to create a differential pressure between the gas generating agent charging chamber, the first plenum chamber, and the second plenum chamber.

In addition, since the combustion gas immediately passes through the first through-hole, the first plenum chamber, the second through-hole, and the second plenum chamber and is discharged to the outside of the housing from the gas discharge path, an air bag is inflated in a reliable and prompt manner. At the same time, the multifunctional member is moved by pressure produced by the combustion gas and ruptures the closing member.

(III) Function to Hold Gas Generating Agent

The function to hold a gas generating agent may be directly performed by the multifunctional member used in the gas generator according to the present invention or may be performed via another member. The function to hold a gas generating agent may be directly performed as follows.

Prior to activation, one surface of the gas generating agent charging chamber is formed by the base plate portion of the multifunctional member and the charged gas generating agent is supported and fixed.

When mounted on a vehicle, the gas generator is also subjected to vibration over a long period of time. If the gas generating agent is insufficiently fixed, there is a risk that gas generating agents may rub against each other and become pulverized.

When the gas generating agent is pulverized in this manner, a designed combustion is not realized and performance of the gas generator is affected.

In the present invention, when the gas generating agent is directly supported and fixed by the multifunctional member, pulverization of the gas generating agent is prevented by the multifunctional member.

A preferable aspect 1 of the invention 1 provides the gas generator, wherein the inner wall surface of the ignition device chamber housing has a first protrusion and a second protrusion formed inward at an interval in the axial direction, and prior to activation, the multifunctional member is fixed by the opening portion of the cylindrical wall portion abutted against the closing member and the base plate portion abutted against the first protrusion, and during activation, the opening portion of the cylindrical wall portion ruptures and opens the closing member, and movement of the multifunctional member in the axial direction is prevented by colliding the base plate portion with the second protrusion.

The preferable aspect 1 of the invention 1 enhances the functions to hold and rupture the closing member and the function to secure the gas discharge path by limiting movement of the multifunctional member in the axial direction during activation.

A preferable aspect 2 of the invention 1 provides the gas generator wherein the first protrusion is an inward protrusion formed by depressing a circumferential wall surface of the ignition device chamber housing from the outside, and the second protrusion is a stepped portion formed in the circumferential wall surface of the ignition device chamber housing facing the second plenum chamber.

Both the first protrusion and the second protrusion of the preferable aspect 1 of the invention 1 may have any protruding shape as long the base plate portion is held and the movement of the base plate portion is limited. For example, as described in the preferable aspect 2 of the invention 1, the first protrusion is an inward protrusion formed by depressing a circumferential wall surface of the ignition device chamber housing from the outside and the second protrusion is a stepped portion formed on the circumferential wall surface of the ignition device chamber housing facing the second plenum chamber.

A preferable aspect 3 of the invention 1 provides the gas generator, wherein the cylindrical wall portion has a slit portion formed in the axial direction thereof and the slit portion is a second through-hole.

The slit portion may be formed over an entire range from the tip (the opening portion) of the cylindrical wall portion to the base plate portion or formed in a partial range between the tip of the cylindrical wall portion and the base plate portion.

While the slit portion may be formed at a plurality of locations at intervals, slit intervals are adjusted so as to maintain a strength that enables the multifunctional member to perform predetermined functions.

For example, a slit width is set to 1 mm or less. However, since the slit width is adjusted in accordance with combustion pressure created in the ignition device chamber housing, a material of the multifunctional member, and a gas discharge rate, the slit width is not limited to this numerical value.

The invention of invention 2 differs from the invention 1 in a shape (structure) of the multifunctional member. In other essential features, functions or the like, it is the same as the invention 1.

The multifunctional member has a columnar portion extending from one surface of the base plate portion at a central portion of the base plate portion.

Using the multifunctional member, the (I) Function to hold and rupture the closing member and the (II) Function to secure a gas discharge path is performed. And, the (III) Function to hold a gas generating agent is also performed.

Due to the use of a novel multifunctional member as a component, the gas generator according to present invention is capable of maintaining high performance during a service life of a vehicle when applied to a restraining device of an air bag system of the vehicle or the like.

Figure 1:
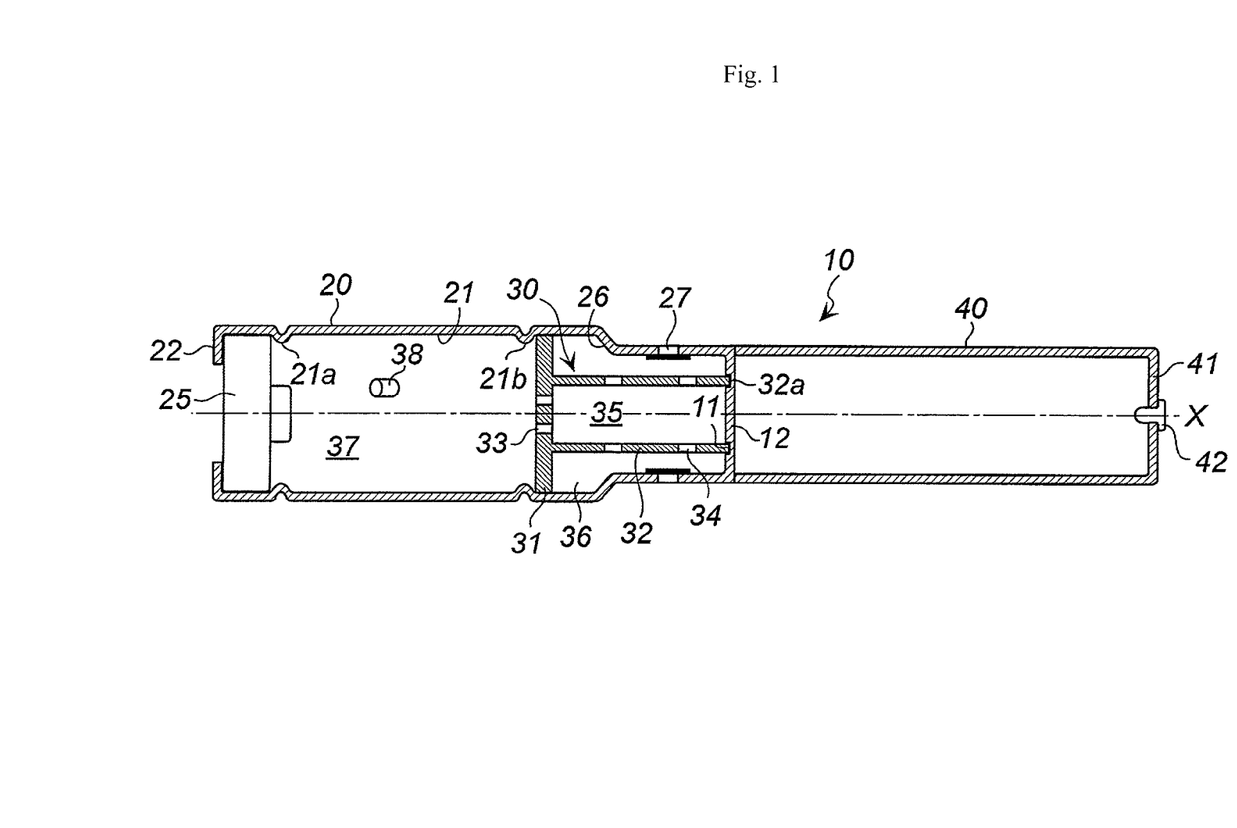
FIG. 1 shows an axial sectional view of a gas generator according to the present invention.
Figure 2:
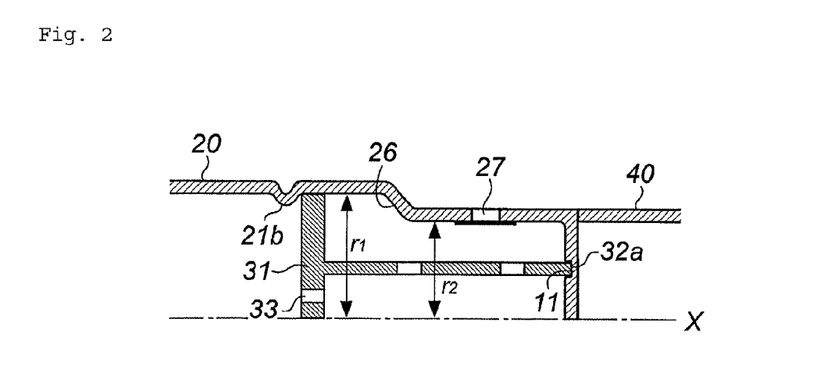
FIG. 2 shows a partial sectional view of FIG. 1.

DESCRIPTION OF EMBODIMENTS (1) Gas Generator Shown in FIGS. 1 and 2

In a gas generator 10, an outer-shell container is formed by joining an ignition device chamber housing 20 to a pressurized gas chamber housing 40.

A closing member 12 having a fragile portion 11 closes between the ignition device chamber housing 20 and the pressurized gas chamber housing 40.

The closing member 12 is integrally formed with a circumferential wall portion at one end of the ignition device chamber housing 20 and is a bottom surface of the ignition device chamber housing 20.

The pressurized gas chamber housing 40 is welded and fixed to the ignition device chamber housing 20 on a side of closing member 12.

The fragile portion 11 is a portion of the closing member 12 which is scored or has a reduced thickness. The fragile portion 11 is preferentially ruptured during activation.

In FIGS. 1 and 2, while the fragile portion 11 is formed on a surface of the closing member 12 in the side of the ignition device chamber housing 20, the fragile portion 11 may be formed on a surface of the closing member 12 in the side of the pressurized gas chamber housing 40 or on surfaces of both sides.

An opening portion (the opening portion opposite to the closing member 12) of the ignition device chamber housing 20 is closed by an electric igniter 25 fixed thereto.

The electric igniter 25 is fixed by being sandwiched in a direction of an axis X between an inward annular protrusion 21a formed on an inner wall surface 21 of the ignition device chamber housing 20 and an opening portion end portion 22 crimped inward.

A multifunctional member 30 having the functions (I) to (III) described above is arranged in the ignition device chamber housing 20.

The multifunctional member 30 has a base plate portion 31 and a cylindrical wall portion 32 extended from one surface of the base plate portion 31.

A preferable aspect 4 of the invention 1 and the invention 2 is that the first through-holes is closed.

The base plate portion 31 is movably abuts against the inner wall surface 21 of the ignition device chamber housing 20 and has a plurality of first through-holes 33 in a thickness direction. The plurality of first through-holes 33 may be closed by an aluminum adhesive tape or the like that is readily ruptured.

A preferable aspect 5 of invention 1 is
that the fragile portion of the closing member is a groove which is circular corresponding to a circumferential edge of the opening portion of the cylindrical wall portion, a width of the fragile portion of the closing member is slightly greater than a width of the circumferential edge of the opening portion, and the entire circumferential edge of the opening portion is fitted into the fragile portion of the closing member or that the fragile portion is formed on the surface of the closing member in a side of the pressurized gas chamber housing, the circumferential edge of opening portion abuts against a position in a closing member, facing the fragile portion.

The cylindrical wall portion 32 shares a same central axis X as the base plate portion 31, and an outer diameter of the cylindrical wall portion 32 is set smaller than an outer diameter of the base plate portion 31. The cylindrical wall portion 32 has a plurality of second through-holes 34 in the thickness direction.

In the cylindrical wall portion 32, a circumferential edge of an opening portion (an opening portion circumferential edge) 32a abuts against the fragile portion 11 of the closing member 12. When the fragile portion 11 is formed on the surface of the closing member 12 in a side of the pressurized gas chamber housing 40, the opening portion circumferential edge 32a abuts against a position facing the fragile portion 11.

In the multifunctional member 30, an annular protrusion (a first protrusion) 21b is formed in the inner wall surface 21 of the ignition device chamber housing 20. Prior to activation, the multifunctional member 30 is fixed in the direction of the axis X due to the base plate portion 31 being abutted against the annular protrusion (the first protrusion) 21b and the circumferential edge 32a of the opening portion being abutted against the fragile portion 11 of the closing member.

A width of the circumferential edge 32a at the opening portion and a width of the fragile portion 11 of the closing member may be about equal to each other or the width of the fragile portion 11 may be set the greater.

Preferably, the width of the circumferential edge 32a at the opening portion and a width of the fragile portion 11 of the closing member are set such that the fragile portion 11 of the closing member is a groove which is circular similarly to the circumferential edge 32a of the opening portion, the width of the fragile portion 11 of the closing member is slightly greater than the width of the circumferential edge 32a of the opening portion, and the entire circumferential edge 32a of the opening portion is fitted into the fragile portion 11 of the closing member.

A stepped portion (a second protrusion) 26 is formed between the annular protrusion 21b and the closing member 12 on the inner wall surface 21 of the ignition device chamber housing.

A radius r1 in a side of the base plate portion 31 with respect to the stepped portion (the second protrusion) 26 and a radius r2 in a side of the closing member 12 with respect to the stepped portion (the second protrusion) 26 have a relationship expressed as r1>r2.

A height (r1−r2) of the stepped portion 26 is equal to or greater than a height (from the inner wall surface 21) of the annular protrusion 21b.

A plurality of gas discharge ports 27 are formed between the stepped portion 26 and the closing member 12 on the inner wall surface 21 of the ignition device chamber housing. For moisture-proofing, the plurality of gas discharge ports 27 are closed from the inside by an aluminum adhesive tape or the like.

A preferable aspect 6 of invention 1 is that a coolant/filter is arranged in the first plenum chamber.

A space enclosed by the base plate portion 31, the cylindrical wall portion 32, and the closing member 12 is a first plenum chamber 35 that corresponds to a gas discharge path. With the gas generator according to the present invention, a known coolant/filter can be arranged in the first plenum chamber 35.

A cylindrical space between an outer wall surface of the cylindrical wall portion 32 and the inner wall surface 21 of the ignition device chamber housing is a second plenum chamber 36 that corresponds to the gas discharge path. The gas discharge ports 27 face the second plenum chamber 36.

A space enclosed by the base plate portion 31, the igniter 25, and the inner wall surface 21 of the ignition device chamber housing is a gas generating agent charging chamber 37 charged with a known molded article of gas generating agent 38.

An amount of the molded article of gas generating agent 38 used is determined appropriately according to the type of the gas generator.

The pressurized gas chamber housing 40 is filled with a gas such as argon or helium under high pressure.

The gas is filled from a gap between a pore and a pin 42, which is inserted into the pore in a bottom surface 41, and the pore. After the gas is filled, the pore is closed by welding the bottom surface 41 and the pin 42 to each other.

Operations of the gas generator (a hybrid-type gas generator) shown in FIG. 1 used in a restraining device of an air bag system for a vehicle will be described below.

When the igniter 25 is activated, the molded article of gas generating agent 38 in the gas generating agent charging chamber 37 is ignited and combusted to generate combustion gas.

A part of the generated combustion gas immediately enters the first plenum chamber 35 through the first through-hole 33, enters the second plenum chamber 36 through the second through-hole 34, ruptures the moisture-proofing seal tape, and is discharged from the gas discharge port 27 to inflate an air bag.

Therefore, a part of the combustion gas can be promptly discharged with the activation of the gas generator and activation (deployment) of a restraining device such as an air bag can be promptly started (a part of the combustion gas is discharged prior to discharge of the pressurized gas).

On the other hand, as pressure in the gas generating agent charging chamber 37 rises due to the generation of the combustion gas, the base plate portion 31 of the multifunctional member 30 is pushed in the direction of the axis X and the cylindrical wall portion 32 is moved in the direction of the axis X. At this point, due to the base plate portion 31 colliding with the stepped portion 26, the cylindrical wall portion 32 is prevented from further moving in the direction of the axis X.

In addition, as the movement of the cylindrical wall portion 32 causes the circumferential edge 32a at the opening portion to push the fragile portion 11, and the closing member 12 is ruptured and opened.

The gas inside the pressurized gas chamber housing 40 enters the first plenum chamber 35 through the opening portion created when the closing member 12 is ruptured and is discharged together with the remaining combustion gas from the gas discharge port 27 via the second through-hole 34 and the second plenum chamber 36 to inflate the airbag.

Figure 3:
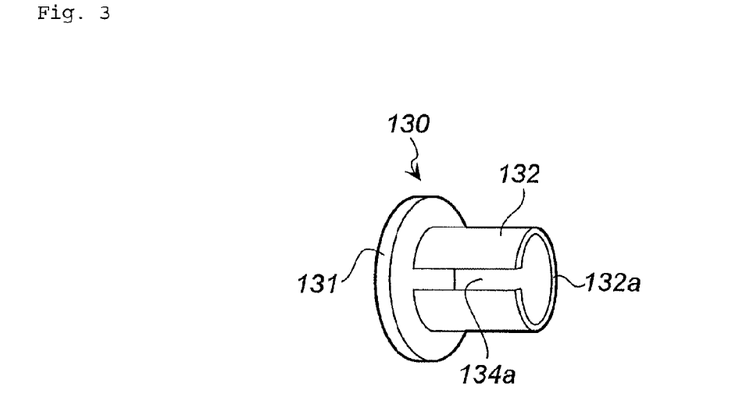
FIG. 3 shows a perspective view of a component of an embodiment that differs from the embodiment shown in FIG. 1.

(2) Gas Generator Having Multifunctional Member Shown in FIG. 3

FIG. 3 is a perspective view of a multifunctional member 130 which is used in a gas generator. The multifunctional member 130 has the same functions and operations as the multifunctional member 30 of the gas generator shown in FIG. 1 with the exception of a shape and a position of the second through-hole 34.

The multifunctional member 130 has a base plate portion 131 and a cylindrical wall portion 132 extended from one surface of the base plate portion 131.

The base plate portion 131 has a first through-hole in a similar manner to the base plate portion 31 shown in FIG. 1.

In the cylindrical wall portion 132, a slit portion 134a, extending from an opening portion circumferential edge 132a to the base plate portion 131, is formed. The slit portion 134a is a second through-hole.

The slit portion 134a may be formed in a part of a range between the opening portion circumferential edge 132a and the base plate portion 131. For example, the slit portion 134a can be formed up to a position approximately halfway in a length direction from the opening portion circumferential edge 132a.

While only one slit portion 134a is shown in FIG. 3, two to four slit portions 134a can be formed at regular intervals. In this case, a slit width or a slit interval is adjusted so as to maintain a strength that enables the multifunctional member 130 to perform predetermined functions.

A preferable aspect 7 of invention 2 is that the fragile portion is a circular depression, and the columnar portion is fitted into the fragile portion.

Figure 4:
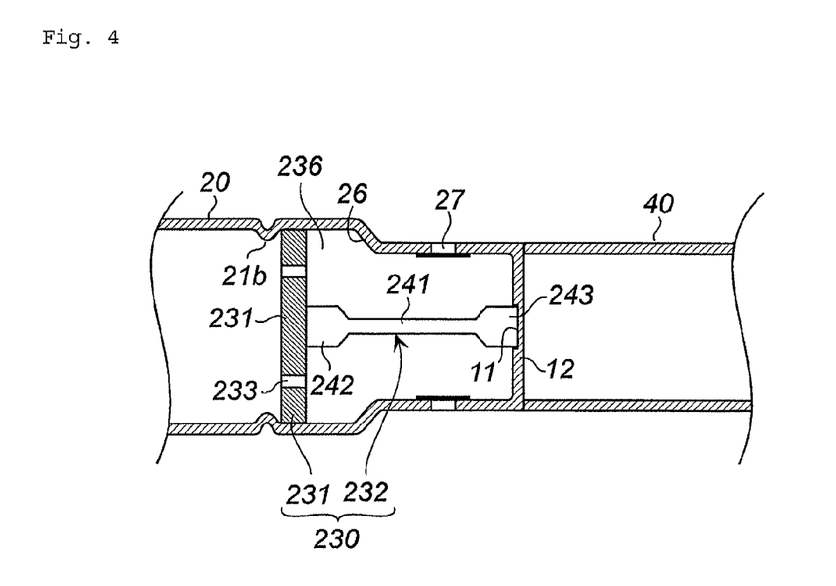
FIG. 4 shows an axial partial sectional view of a gas generator according to still another embodiment that differs from the embodiment shown in FIG. 1.

(3) Gas Generator Shown in FIG. 4

The gas generator shown in FIG. 4 is the same as the gas generator 10 shown in FIG. 1 with the exception of using a multifunctional member 230 in place of the multifunctional member 30.

The multifunctional member 230 has a base plate portion 231 and a columnar portion 232 extended from one surface of the base plate portion 231 at a central portion of the base plate portion 231.

The base plate portion 231 has a first through-hole 233 in a thickness direction.

The columnar portion 232 has a first supporting base portion 242 at the base plate portion 231 and a second supporting base portion 243 abutting against the fragile portion 11 of the closing member 12. The first supporting base portion 242 and the second supporting base portion 243 are coupled to each other by a supporting column portion 241.

Outer diameters of the first supporting base portion 242 and the second supporting base portion 243 are set greater than an outer diameter of the supporting column portion 241.

The second supporting base portion 243 abuts against the fragile portion 11 of the closing member.

The second supporting base portion 243 has a circular sectional shape and the fragile portion 11 is a circular depression. A tip surface of the second supporting base portion 243 is fitted into the fragile portion 11.

A plenum chamber 236 is formed by being enclosed by the base plate portion 231, the inner wall surface 21 of the ignition device chamber housing, and the closing member 12.

The gas discharge port 27 faces the plenum chamber 236.

Operations of the gas generator as a restraining device in an air bag system for a vehicle will be described below. In this gas generator (a hybrid gas generator), a part of the gas generator shown in FIG. 1 is replaced with that shown in FIG. 4.

When the igniter 25 is activated, the molded article of gas generating agent 38 in the gas generating agent charging chamber 37 is ignited and combusted to generate combustion gas. A part of the combustion gas immediately passes through the first through-hole 233 and the plenum chamber 236 and is discharged to outside of the housing from the gas discharge port 27.

On the other hand, as pressure in the gas generating agent charging chamber 37 rises due to the generation of the combustion gas, the base plate portion 231 of the multifunctional member 230 is pushed in the axial direction and the columnar portion 232 is moved in the axial direction. At this point, due to the base plate portion 231 colliding with the stepped portion 26, the columnar portion 232 is prevented from further moving in the axial direction.

In addition, as the movement of the columnar portion 232 causes the second supporting base portion 243 to push the fragile portion 11, the closing member 12 is ruptured and opened. Moreover, since the supporting column portion 241 has a smaller diameter, the columnar portion 232 never blocks the gas discharge path which is opened by the ruptured closing member 12 (a portion that remains while still being integrated with the ignition device chamber housing), and discharge of the pressurized gas is performed in a smooth manner.

The combustion gas generated in the gas generating agent charging chamber 37 enters the plenum chamber 236 from the first through-hole 233, ruptures the moisture-proofing seal tape, and is discharged from the gas discharge port 27 to inflate the airbag.

And, the gas in the pressurized gas chamber housing 40 enters the plenum chamber 236 from an opening portion created due to the rupture of the closing member 12 and is discharged together with the remaining combustion gas from the gas discharge port 27 to inflate the air bag.

Note that, in the gas generator according to the present invention, a specific embodiment of the gas generator is not limited to the present embodiment as long as the problem described above can be solved. For example, different embodiments can be adopted with respect to a shape of the multifunctional member, the annular protrusion and the stepped portion formed on the ignition device chamber housing, and the like in order to realize similar functions.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
  a cylindrical ignition device chamber housing provided with a gas discharge port, accommodating an igniter and a gas generating agent therein, the igniter closing an opening portion of the ignition device chamber housing and being fixed thereto;
  a cylindrical pressurized gas chamber housing filled with pressurized gas, the cylindrical pressurized gas chamber housing being joined to the ignition device chamber housing to form an outer shell container;
  a closing member being provided with a fragile portion and closing between the ignition device chamber housing and the pressurized gas chamber housing;
  a multifunctional member that is movable in an axial direction during activation being arranged inside the ignition device chamber housing together with the igniter and the gas generating agent the multifunctional member having,
- a base plate portion abutting against an inner wall surface of the ignition device chamber housing and having a first through-hole in a thickness direction, and
- a cylindrical wall portion extending from one surface of the base plate portion, the cylindrical wall portion having an opening portion at a distal end thereof and a smaller outer diameter than an outer diameter of the base plate portion, and being provided with a second through-hole in the thickness direction thereof, the opening portion of the cylindrical wall portion abutting against the fragile portion of the closing member;

a first plenum chamber enclosed by the base plate portion, the cylindrical wall portion and the closing member;

a second plenum chamber formed by a cylindrical space between an outer wall surface of the cylindrical wall portion and the inner wall surface of the ignition device chamber housing, and being disposed such that the gas discharge port is provided in a circumferential wall portion of the ignition device chamber housing and facing the second plenum chamber;

a gas generating agent charging chamber enclosed by the base plate portion, the igniter, and the inner wall surface of the ignition device chamber housing and charged with the gas generating agent, by pressure increase inside the ignition device chamber housing due to combustion gas generated by combustion of the gas generating agent, the multifunctional member being moved in the axial direction to rupture the closing member, the combustion gas passing through the first through-hole, the first plenum chamber, the second through-hole and the second plenum chamber, and being discharged from the gas discharge port, the pressurized gas inside the pressurized gas chamber housing entering the first plenum chamber from an opening portion obtained by rupture of the closing member, passing through the second through-hole and the second plenum chamber, and being discharged from the gas discharge port.

2. The gas generator according to claim 1, wherein:
the inner wall surface of the ignition device chamber housing has a first protrusion and a second protrusion formed inward at an interval in the axial direction, and
prior to activation, the multifunctional member is fixed by the opening portion of the cylindrical wall portion abutted against the closing member and the base plate portion abutted against the first protrusion, and
during activation, the opening portion of the cylindrical wall portion ruptures and opens the closing member, and movement of the multifunctional member in the axial direction is prevented by colliding the base plate portion with the second protrusion.

3. The gas generator according to claim 2, wherein the first protrusion is an inward protrusion formed by depressing a circumferential wall surface of the ignition device chamber housing from the outside, and
the second protrusion is a stepped portion formed in the circumferential wall surface of the ignition device chamber housing facing the second plenum chamber.

4. The gas generator according to claim 1, wherein the cylindrical wall portion has a slit portion formed in the axial direction thereof and the slit portion is a second through-hole.

5. The gas generator according to claim 1, wherein:
the fragile portion of the closing member is a groove which is circular corresponding to a circumferential edge of the opening portion of the cylindrical wall portion, a width of the fragile portion of the closing member is slightly greater than a width of the circumferential edge of the opening portion, and the entire circumferential edge of the opening portion is fitted into the fragile portion of the closing member or
the fragile portion is formed on the surface of the closing member in a side of the pressurized gas chamber housing, the circumferential edge of opening portion abuts against a position in a closing member, facing the fragile portion.

6. The gas generator according to claim 1, wherein a coolant/filter is arranged in the first plenum chamber.

7. A gas generator, comprising:
a cylindrical ignition device chamber housing provided with a gas discharge port, accommodating an igniter and a gas generating agent therein, the igniter closing an opening portion of the ignition device chamber housing and being fixed thereto;
a cylindrical pressurized gas chamber housing filled with pressurized gas, the cylindrical pressurized gas chamber housing being joined to the ignition device chamber housing to form an outer shell container;
a closing member being provided with a fragile portion and closing between the ignition device chamber housing and the pressurized gas chamber housing;
a multifunctional member that is movable in an axial direction during activation being arranged inside the ignition device chamber housing together with the igniter and the gas generating agent,
the multifunctional member having,
- a base plate portion abutting against an inner wall surface of the ignition device chamber housing and having a first through-hole in a thickness direction, and
- a columnar portion extending from a central portion of one surface of the base plate portion and abutting against the fragile portion of the closing member;

a plenum chamber formed by the base plate portion, the inner wall surface of the ignition device chamber housing and the closing member, and being disposed such that the gas discharge port is provided in a circumferential wall portion of the ignition device chamber housing and facing the plenum chamber;

a gas generating agent charging chamber enclosed by the base plate portion, the igniter, and the inner wall surface of the ignition device chamber housing and charged with the gas generating agent, by pressure increase inside the ignition device chamber housing due to combustion gas generated by combustion of the gas generating agent, the multifunctional member being moved in the axial direction to rupture the closing member, the combustion gas passing through the first through-hole, the plenum chamber, and being discharged from the gas discharge port, the pressurized gas inside the pressurized gas chamber housing entering the plenum chamber from an opening portion obtained by rupture of the closing member, passing and being discharged from the gas discharge port.

8. The gas generator according to claim 1, wherein the first through-hole is closed.

9. The gas generator according to claim 7, wherein the fragile portion is a circular depression, and the columnar portion is fitted into the fragile portion.

10. The gas generator according to claim 7, wherein the first through-hole is closed.

* * * * *